United States Patent [19]

Whitmarsh

[11] Patent Number: 4,936,204
[45] Date of Patent: Jun. 26, 1990

[54] FRUIT SEGMENTER

[76] Inventor: William R. Whitmarsh, 915 S. Main St., Horseheads, N.Y. 14845

[21] Appl. No.: 214,216

[22] Filed: Jun. 27, 1988

Related U.S. Application Data

[63] Continuation-in-part of Ser. No. 70,328, Jul. 6, 1987, abandoned.

[51] Int. Cl.⁵ .................. A23N 4/00; A23N 4/12; A23N 15/00
[52] U.S. Cl. .......................... 99/538; 99/509; 99/556; 99/561; 99/594
[58] Field of Search .................. 99/537, 538, 542–545, 99/547, 549, 550, 552, 559–561, 564, 565, 590, 594; 83/396, 267, 733; 30/302

[56] References Cited

U.S. PATENT DOCUMENTS

| | | | |
|---|---|---|---|
| 782,629 | 2/1905 | Templeton | 83/733 |
| 951,241 | 3/1910 | Hampel | 99/556 |
| 1,060,771 | 5/1913 | Lee | 83/733 |
| 1,113,377 | 10/1914 | Silvius | 83/733 |
| 1,631,854 | 6/1927 | Carroll | 99/542 |
| 2,240,910 | 5/1941 | Polk, Sr. et al. | 99/538 |
| 2,457,645 | 12/1948 | Cummings | 99/538 |
| 2,558,579 | 6/1951 | Polk, Sr. et al. | 99/538 |
| 2,627,884 | 2/1953 | Polk, Sr. et al. | 99/538 |
| 2,647,549 | 8/1953 | Koch | 99/509 |
| 2,733,746 | 2/1956 | Rauner | 99/556 |
| 3,754,470 | 8/1973 | Console | 99/538 |
| 4,386,560 | 6/1983 | Ditty | 99/594 |
| 4,426,924 | 1/1984 | Culwell | 99/564 |
| 4,565,053 | 1/1986 | Browne et al. | 83/733 |

Primary Examiner—Timothy F. Simone
Attorney, Agent, or Firm—Richard C. Litman

[57] ABSTRACT

A citrus fruit segmenter which uses a slicing lever mounted with a blade which is attached to the sidewalls of a frame by another pair of levers. The slicing lever with the blade nudges a resiliently biased crank lever which intermittently rotates a ratchet wheel upon which a cup is mounted to carry a half of grapefruit or large orange. The crank lever has a tooth element designed to engage the toothed ratchet wheel and to retract when working against a locking pawl. The tooth element is also resiliently biased. The resilient biasing of the crank lever and the toothed element are accomplished by corrosion-resistant "O" rings. All of the elements of the device are made of corrosion-resistant material. The blade is made of stainless steel, the frame and levers are made of synthetic resinous material.

11 Claims, 3 Drawing Sheets

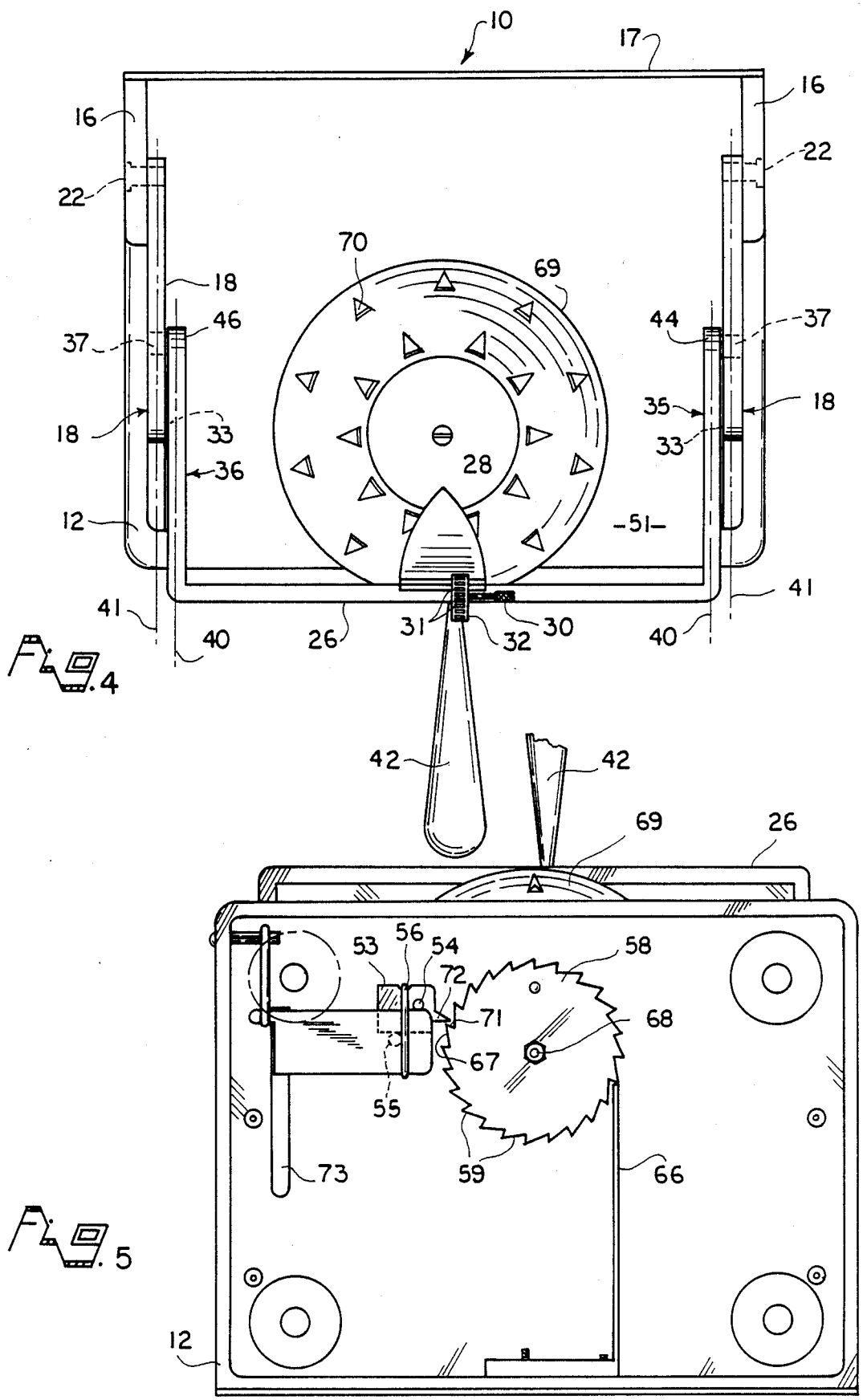

FRUIT SEGMENTER

SUMMARY OF THE INVENTION

This present application is a continuation-in-part of application Ser. No. 070,328 filed Jul. 6, 1987, now abandoned.

This invention sections or segments a half of a grapefruit that has been cored previous to the operation of the invention. The device comprises a lever assembly supported by walls on a frame situated on a hollow base. The lever assembly drives a rotary ratchet wheel to index the half of grapefruit in preparation for each slicing sectioning operation. A knife blade is centrally located on a bifurcated lever anchored by two other simpler levers to the rearmost parts of sidewalls. The bifurcated lever nudgingly drives a crank lever which is also pivotably mounted on one of the sidewalls. In turn, the crank lever intermittently drives the ratchet wheel mounted on a shaft with a holding cup for the half of grapefruit. The grapefruit is thereby indexed for each slicing operation.

An important object of this invention is to cut a grapefruit into equal segments with a manual operation.

It is a further object of this invention to provide a readilY available corer that is round, ground sharp, has a serrated edge on the cutting portion and that is hand-operated.

It is a further object of this invention to adjustably maintain the position of a knife blade so that anY reasonably sized grapefruit may be accommodated in the sectioning operation.

It is a further object of this invention to provide a lever type assembly to cut and drive, through such assembly, a ratchet wheel to index the half a grapefruit and ready it for slicing.

It is a further object of this invention to provide a speciallly-designed slidable tooth element to cooperate with the ratchet wheel to index the grapefruit.

It is a further object to design a readilY-washed and corrosion-resistant device that is easily maintained and submerged when cleansed.

It is a further object to present a very compact and complete device that includes even the corer for the initial operation of coring the grapefruit in preparation for the sectioning operation.

BACKGROUND OF THE INVENTION

U.S. Utility Pat. No. 2,240,908 issued to R. Polk, Sr. et al is drawn to a device for segmenting citrus fruit which includes an assembly of separate pairs of blades for individual segments. The blades are pivotably attached to each other in said pairs.

U.S. Utility Pat. No. 1,631,854 issued to J.R. Carroll is drawn to a device for coring and derinding a fruit with means to rotate the fruit and cut with a curved derinding knife after a coring operation.

U.S. Utility Pat. No. 2,503,097 issued to J.H. Chavez is drawn to a grapefruit sectioning device that includes a multiplicity of blades radiating from a central assembly.

U.S. Utility Pat. No. 1,794,800 issued to R. Smith is drawn to a simple hand tool without moving parts for coring and sectioning fruit.

U.S. Utility Pat. No. 1,293,351 issued to S.E. Creasey is drawn to a corer with a substantiallY cylindrical blade with serrations at the slicing wedge.

U.S. Utility Pat. No. 2,468,282 issued to M.W. Wood is drawn to a coring and cutting device for grapefruit with radial blades to section the fruit.

BRIEF DESCRIPTION OF THE DRAWINGS

FIG. 4 is a top view of the device of FIG. 1 with the slicing lever poised for the slicing operation; and FIG. 5 is a bottom view of the invention showing the ratcheting mechanism in detail.

DETAILED DESCRIPTION

Figure 1:
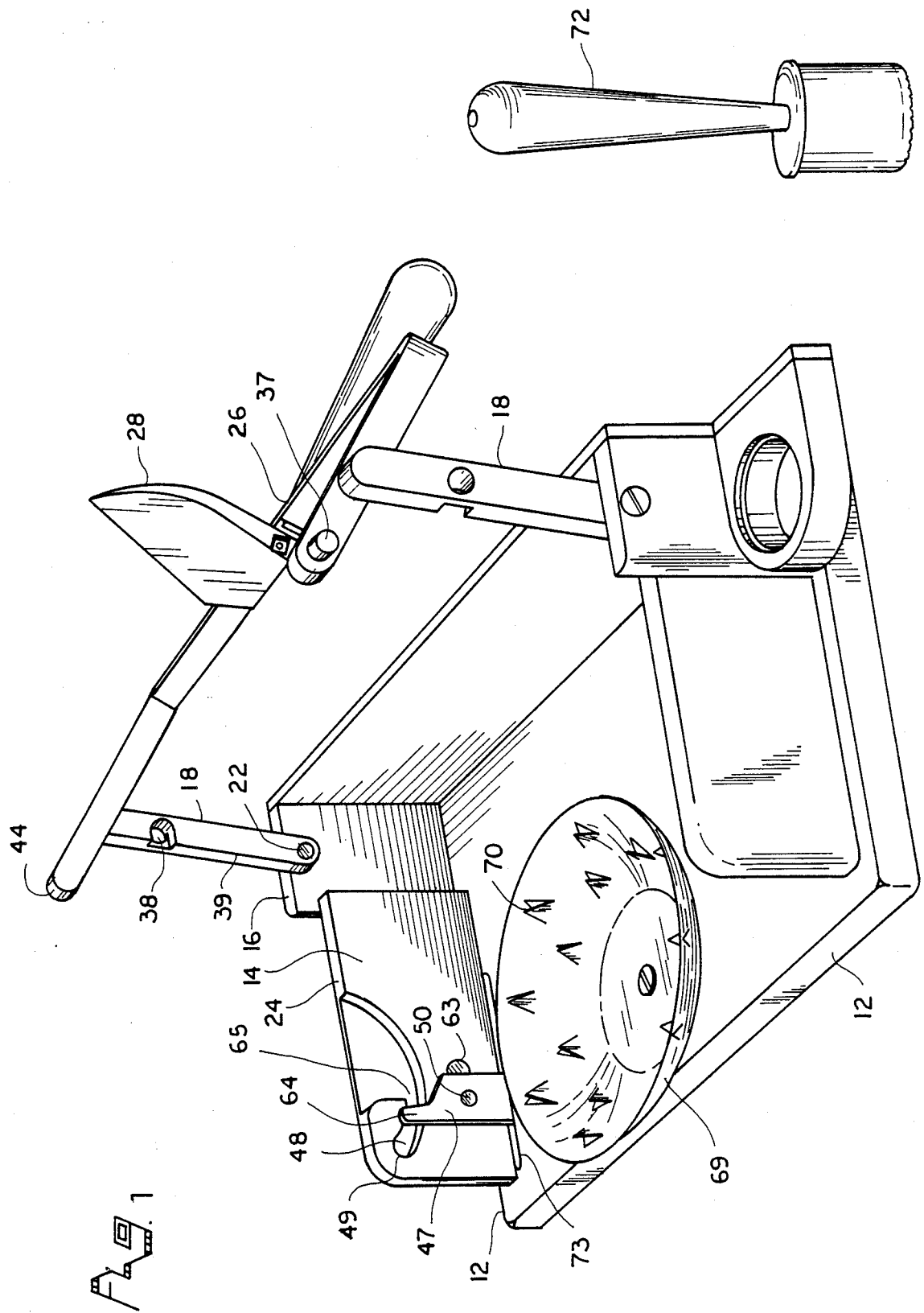
FIG. 1 is an overall perspective view of the fruit sectioner.

The invention is held in a frame 10 which includes a hollow base 12 and two composite sidewalls 14 and 16 and back wall 17. The composite sidewalls 14 and 16 are each comprised of two contiguous parallel walls 14 and 16. The rearmost of these walls 16 each pivotably support a lever 18 at the top portion 20 of each of the rearmost walls 16. The pivot 22 arranges this lever 18 so that it is stopped in arcuate motion by the forwardmost sidewall 14 at the top 24 of this sidewall 14 and the lever 18 is then horizontal and parallel to the base 12. Attached at the opposite ends of this first pair of levers is a bifurcated slicing lever 26 with a blade 28 centrally located and adjustably positioned at 30 (see FIG. 4). The adjustment is by a rack 31 and pinion 32 arrangement, the rack 31 being rigidlY coupled to the blade 28 and the pinion 32 rotatably assembled on the bifurcated slicing lever 26. The first pair of levers 18 are pivotably attached to a fulcrum 33 rigidly disposed near the mid portion 34 of the parallel portions 35,36 of the bifurcated slicing lever 26. Also rigidly attached to the tip ends of these parallel portions 35,36 of the bifurcated slicing lever 26 are two lugs 37, one on each parallel portion 35,36 which may be cammed in arcuate receptors 38 in the mid portions 39 of the first levers 18. When the lugs are received fully in the receptors 38 the axes 40 of the parallel portions 35,36 of the bifurcated slicing lever 26 and the axes 41 of first levers 18 form aligned pairs. When aligned the handle 42 of the bifurcated slicing lever 26 may be swung to place the first levers 18 in the position previouslY described at the top portion 24 of each of the forwardmost sidewalls 14 in a horizontal orientation, so that horizontally disposed the bifurcated slicing lever 26 alone may be swung about the pivots 33 that hold this bifurcated slicing lever 26 to the first levers 18. When this action is made to happen, the previously mentioned lugs 37 penetrate a cam space 41 in the forwardmost sidewalls 18, and one tip end 44 of the lower tip ends 44 and 46 of the bifurcated slicing lever 26 abuts a crank lever 47 and so rotates it. The lug 37 penetrates all the way to an arcuate path portion 48 of the cam space 41 where abutment with the extreme wall 49 of the arcuate path portion of the cam space 41 stops further rotation of the bifurcated slicing lever 26 and thus further rotation of the crank lever 47.

The crank lever 47 extends from its support on the wall at pivot 50 to below the upper surface 51 of the hollow base 12. In the hollow base 12 the crank lever 47 has an integral horizontal portion 52 that has a resiliently slidably mounted tooth element 53 contained thereon by two pins 54 and 55 and the resilient "0" ring 56 stretched around both the tooth element 53 and the horizontal portion 57 of the crank lever 47. Pin 55 is attached to the upper surface of the horizontal portion of the crank lever and pin 54 is attached to the lower surface of the tooth element 53.

Figure 2:
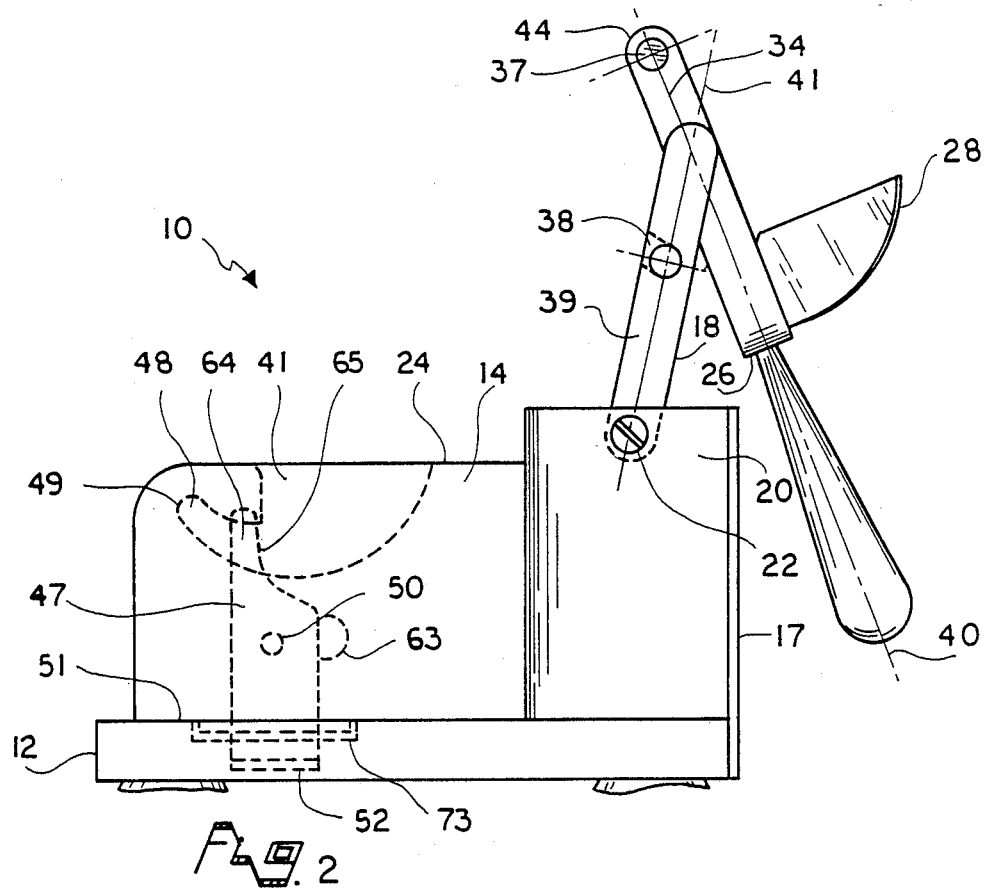
FIG. 2 is a side elevation view of the device of FIG. 1.
Figure 3:
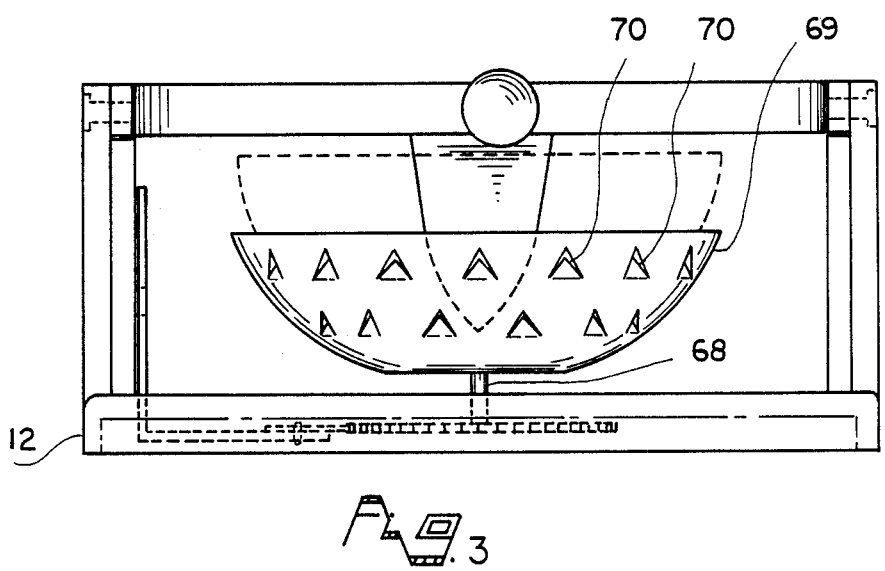
FIG. 3 is a front elevation view of the device of FIG. 1.

The ratchet wheel 58 with its teeth 59 cam the tooth element 53 into substantially reciprocating motion with respect to the horizontal portion 57 of the crank lever 47, working to and fro against the resiliency of the "0" ring 56. Another "0" ring 60 is wrapped around a pin 61 to attach the "0" ring 60 to a wall 12 of the base 12 and stretched to a lug 62 on the bottom of the vertical portion of the crank lever 47 near where horizontal portion 57 is integrally connected to the vertical portion. This other "0" ring 60 serves to resiliently bias the crank lever 47 into and toward abutment with another pin 63 on the wall 14 (see FIG. 2). This pin stops rotation of the crank lever 47 in one rotational direction to a position where an upper lip 64 of the crank lever 47 is substantially aligned with the mouth 65 (see FIG. 2) of the previouslY-mentioned arcuate path portion 48 of the cam space 41 in the appropriate forwardmost wall 14 of the sidewalls 18. The lower tip 44 of the bifurcated lever that engages the upper lip 64 of the crank lever causes the upper lip 64 to reciprocate against the action of said other "0" ring 60 just mentioned through a small angle.

This small angle is large enough to make the tooth element 53 on the horizontal portion of the crank lever drive the ratchet wheel 58 through an arc subtended by one of its teeth 59.

A pawl 66 resiliently restricts motion of the ratchet wheel to one direction.

It is important to mention that there is a slot 73 (see FIGS. 2 and 5) in the upper surface of the base and through the top of the base and that this slot accommodates the reciprocating angular motion of the crank lever 47.

MODE OF OPERATION

First the sliced-in-half grapefruit is cored with the corer at 72. A shaft 68 on which the ratchet wheel 58 is rotated passes through the top of the base to rotatably mount a cup 69 to hold the half of the grapefruit readY for sectioning. The cup has piercing tabs 70 cut from the wall of the cup to stabilize the fruit by penetrating its skin so that the rotative motion of the ratchet wheel will index the grapefruit for every slicing-downward thrust of the bifurcated slicing lever 26. Every time the slicing lever 26 is thrust downwardly it cuts a radial section of the grapefruit and when the blade is withdrawn from the fruit the motion of crank lever 47 cocks the tooth element 53 to ready it for indexing the grapefruit. During the cocking motion the ratchet wheel 58 is held from rotation by the pawl 66 attached to the wall of the base. Also during the cocking motion the portion of the ratchet wheel 58 tooth 59 in engagement with the tooth element 53, resiliently and slidably engaged on the horizontal portion of the crank lever 47, causes this tooth element 53 to be pivotably retracted away from the center of the ratchet wheel 58. Once the engaging portion 67 of the ratchet wheel tooth disengages from the tooth element 53 the resiliency of 0-ring 56 causes the retracted tooth element to return to an extended position, as shown in FIG. 5, ready to engage again the ratchet wheel 58 but on the back surface 71 of this tooth 59 in succession. The engaging teeth surfaces at 71 and 72 are abutted to transmit motion to the ratchet wheel 58.

When the bifurcated slicing lever 26 is initially thrust downward toward the fruit the pawl 66 allows the ratchet wheel 58 to turn in the direction of the abutting tooth element 53 and so index the grapefruit, readying it for the next slicing motion. Initial downward thrust of the slicing lever returns the resilientlY biased crank lever 47 to drive ratchet wheel 58.

The use of the first pair of levers 18 compounded with the bifurcated slicing lever 26 is to relieve the action of the device from unwanted motion when slicing, from the motion necessarY to relieve the device of the finished sectioned grapefruit or to put a new unsectioned grapefruit in the cup.

I claim:

1. A fruit segmenter comprising:
   pivoting lever means for slicing a fruit;
   ratchet means for step by step rotational arcuate indexing of said fruit;
   said pivoting lever means including a slicing lever;
   a blade located and adjustably positioned on said slicing lever;
   said ratchet means includes a crank lever; and said pivoting lever means rotating and contacting said crank lever and indexing said ratchet means;
   whereby said pivoting lever means slices said fruit and then indexes said fruit by a set arcuate step to be ready for slicing again.

2. A fruit segmenter comprising:
   a frame holding a mechanism;
   said mechanism including lever means and ratchet means;
   said frame including wall means for supporting said lever means and base means for supporting said ratchet means;
   said lever means including a crank lever and a slicing lever;
   a blade centrally located and adjustably positioned on said slicing lever;
   said crank lever driven by said slicing lever; and
   said ratchet means driven by said crank lever for rotatably indexing a cup for holding a piece of fruit to allow said blade synchronously, before and after said indexing, to slice said fruit.

3. Said fruit sections of claim 2 wherein:
   said slicing lever is bifurcated.

4. Said fruit segmenter of claim 3 further comprising:
   said slicing lever pivotablY connected through linkage to said wall means.

5. Said fruit segmenter of claim 4 wherein:
   said linkage comprises two levers pivotably connected to said wall means and pivotably connected to said slicing lever.

6. Said fruit segmenter of claim 5 wherein:
   said crank lever is resiliently biased toward one orientation and includes a tooth element also resiliently biased toward one orientation on said crank lever.

7. Said fruit segmenter of claim 6 wherein:
   said ratchet means includes a ratchet wheel in engagement with said toothed element and a pawl, both to effect motion of said ratchet wheel in one rotational direction.

8. The fruit segmenter of claim 7 wherein:
   "0" rings resiliently bias said crank lever and said toothed element.

9. The fruit segmenter of claim 8 wherein:
   said crank lever has "L" shaped configuration with a vertical portion and a horizontal portion with said toothed element slidably disposed on the horizontal portion.

10. The fruit segmenter of claim 3 wherein: said blade is adjustably positioned on said slicing lever by a rack and pinion.

11. The fruit segmenter of claim 3 wherein: said wall means also supports bore means for holding a readily available corer for said fruit sectioner.

* * * * *